US011602902B2

(12) United States Patent
Soler Pedemonte et al.

(10) Patent No.: US 11,602,902 B2
(45) Date of Patent: Mar. 14, 2023

(54) THREE DIMENSIONAL PRINTING SYSTEM

(71) Applicant: HEWLETT-PACKARD DEVELOPMENT COMPANY, L.P., Spring, TX (US)

(72) Inventors: Xavier Soler Pedemonte, Sant Cugat del Valles (ES); Esteve Comas Cespedes, Sant Cugat del Valles (ES); Juan Ramos Campos, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 17/828,541

(22) Filed: May 31, 2022

(65) Prior Publication Data

US 2022/0288865 A1    Sep. 15, 2022

Related U.S. Application Data

(63) Continuation of application No. 16/608,857, filed as application No. PCT/US2018/013794 on Jan. 16, 2018, now Pat. No. 11,376,797.

(51) Int. Cl.
*B29C 64/393* (2017.01)
*B29C 64/268* (2017.01)
(Continued)

(52) U.S. Cl.
CPC .......... *B29C 64/393* (2017.08); *B29C 64/165* (2017.08); *B29C 64/268* (2017.08);
(Continued)

(58) Field of Classification Search
None
See application file for complete search history.

(56) References Cited

U.S. PATENT DOCUMENTS 5,840,239 A    11/1998 Partanen et al.
6,647,035 B1 *  11/2003 Freitas ................. H01S 5/4025
                                                           372/36
(Continued)

FOREIGN PATENT DOCUMENTS

CN    104379324 A    2/2015
CN    107187017       9/2017
(Continued)

OTHER PUBLICATIONS

Zavala-Arredondo et al., Laser diode area melting for high speed additive manufacturing of metallic components, Materials & Design, vol. 117, Mar. 5, 2017, pp. 305-315 (Year: 2017).*

(Continued)

*Primary Examiner* — Yung-Sheng M Tsui
(74) *Attorney, Agent, or Firm* — Shook, Hardy & Bacon L.L.P.

(57) ABSTRACT

A method and system for a three dimensional printing system are described herein. In one example, the three dimensional printing system has a moveable carriage, an array of laser modules and a print controller. In this example, the moveable carriage has a print head arranged to selectively deposit a printing agent on to a layer of build material as the moveable carriage is moved relative to the layer of build material. The printing agent controls localized fusing of the build material on application of energy. The print controller is communicatively coupled to the array of laser modules and controls activation of individual laser modules of the array of laser modules so as to apply, selectively, energy to addressable sub-regions of the layer of build material on which printing agent has been deposited to control fusing together with the deposited printing agent.

20 Claims, 4 Drawing Sheets

(51) Int. Cl.
  *B29C 64/165* (2017.01)
  *B33Y 10/00* (2015.01)
  *B33Y 30/00* (2015.01)
  *B33Y 50/02* (2015.01)
  *B29K 77/00* (2006.01)

(52) U.S. Cl.
  CPC .......... *B29K 2077/00* (2013.01); *B33Y 10/00* (2014.12); *B33Y 30/00* (2014.12); *B33Y 50/02* (2014.12)

(56) References Cited

U.S. PATENT DOCUMENTS

| | | | |
|---|---|---|---|
| 10,170,893 B1 * | 1/2019 | Tazzoli | ............... H01S 5/02365 |
| 2004/0052280 A1 * | 3/2004 | Rice | ................... H01S 5/02423 |
| | | | 372/36 |
| 2016/0257071 A1 | 9/2016 | Okamoto | |
| 2016/0332380 A1 | 11/2016 | De Pena et al. | |
| 2017/0173696 A1 | 6/2017 | Sheinman | |
| 2017/0271843 A1 | 9/2017 | Batchelder et al. | |
| 2018/0281286 A1 | 10/2018 | Vilajosana et al. | |
| 2019/0001557 A1 * | 1/2019 | Smith, III | .............. B33Y 10/00 |
| 2019/0099942 A1 | 4/2019 | Thompson et al. | |
| 2019/0177473 A1 | 6/2019 | Bashir et al. | |
| 2019/0202127 A1 | 7/2019 | Ng et al. | |
| 2020/0016655 A1 * | 1/2020 | Crump | ................... B22F 12/45 |

FOREIGN PATENT DOCUMENTS

| | | | |
|---|---|---|---|
| CN | 108582769 A | 9/2018 | |
| EP | 3221125 | 9/2017 | |
| WO | WO-2013091684 | 6/2013 | |
| WO | WO-2013154723 | 10/2013 | |
| WO | WO-2017200534 | 11/2014 | |
| WO | WO-2015091485 A1 | 6/2015 | |
| WO | WO-2015108550 | 7/2015 | |
| WO | WO-2016048348 | 3/2016 | |
| WO | WO-2016048348 A1 * | 3/2016 | ......... B29C 35/0805 |
| WO | 2016/080993 A1 | 5/2016 | |
| WO | WO-17012663 | 1/2017 | |
| WO | WO-17013242 | 1/2017 | |
| WO | WO-17071760 | 5/2017 | |

OTHER PUBLICATIONS

Zavala-Arredondo; "Laser Diode Area Melting for High Speed Additive Manufacturing of Metallic Components"; Mar. 5, 2017; pp. 305-315.

* cited by examiner

THREE DIMENSIONAL PRINTING SYSTEM

BACKGROUND

A convenient way of producing a three dimensional object is to fabricate the object using a three dimensional printing system. Certain three dimensional printing systems produce three dimensional objects by dividing a model of the object into slices and fabricating the object in a layer-by-layer fashion. In one of these cases, a layer of build material is spread across a platen or build platform. A fusing agent is then deposited from a print head of the three dimensional printing system in certain locations on the layer of build material. Heat energy is applied from an energy source. The fusing agent controls a thermal profile of the layer of build material and in turn controls the fusion of build material when heat energy is applied. The fused build material thus forms solid portions of the object within the layer. The whole object is fabricated by repeating the process for each slice. In this manner, a large variety of objects can be efficiently fabricated.

BRIEF DESCRIPTION OF THE DRAWINGS

Various features of the present disclosure will be apparent from the detailed description which follows, taken in conjunction with the accompanying drawings, which together illustrate features of the present disclosure, and wherein.

DETAILED DESCRIPTION

Figure 1:
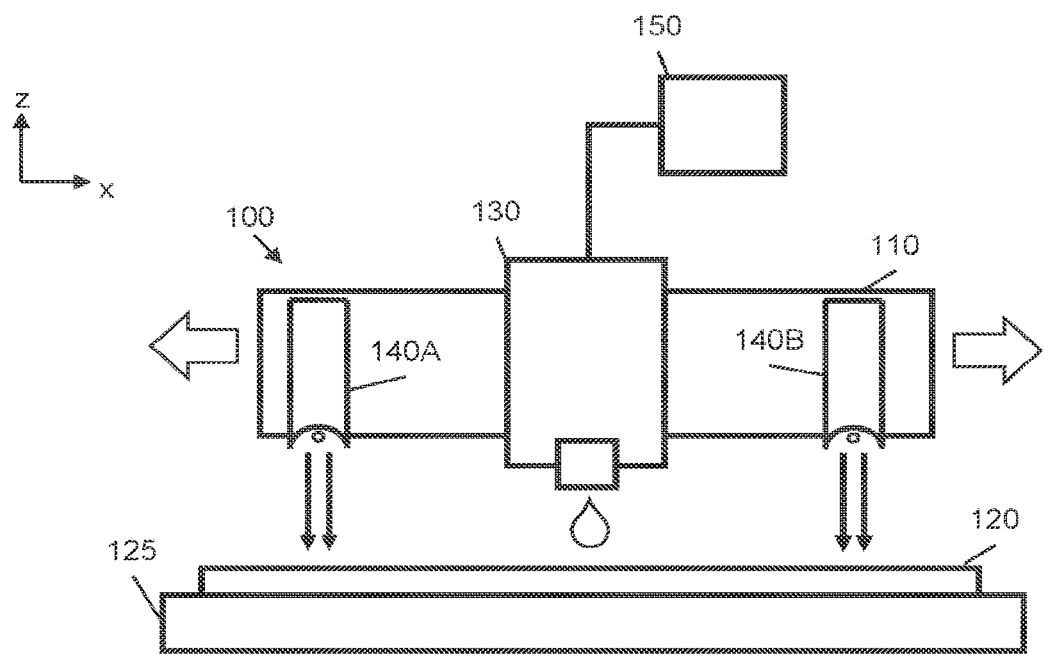
FIG. 1 is a schematic diagram of a three dimensional printing system according to an example.

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

Certain examples described herein relate to methods and systems for fabricating three-dimensional objects from build materials. In certain examples described herein build materials include, are formed from, or may include, short fibres that may, for example, have been cut into short lengths from long strands or threads of material. Examples of build materials include cover plastics, ceramic, and metal powders and/or powder-like materials. Certain examples of the methods and systems described herein control an amount of energy applied to sub-regions of a layer of deposited build material. This in turn controls fusing of the build material at selective locations, together with application of one or more printing agents. The printing agents may be a fusing agent and/or a detailing agent. Printing agents such as detailing agent may also be used to control thermal aspects of a layer of build material.

It is desirable that fabrication processes output high quality objects. In practice, the quality of fabricated objects is limited by the capabilities of the hardware of the three dimensional printing system. Inaccuracies or undesirable artefacts of fabrication processes are often visible in the final fabricated object. This may include "fuzzy" or poorly defined surfaces and curl. Issues with object quality during fabrication also leads to material wastage and, in the worst case, fabricated objects being discarded.

In certain cases, artefacts are the result of undesired fusing or partial fusing of build material during the application of energy to the build material layer. This can be caused by a number of different hardware-related issues. For example, poor control of the print head or data errors will result in fusing agent being deposited in locations which deviate from the intended locations. In other cases inaccurate application of heat energy to the build material layer can also lead to unwanted artefacts.

Infrared (IR) lamps are used in some comparative three dimensional printing systems to apply energy to (e.g. heat) the build material layer. It is technologically challenging to miniaturize IR lamps. Consequently, when an IR lamp is used in a three dimensional printing system, the heat energy that is emitted by the IR lamp is over a larger area of the build material layer than is desirable. This results in uniform or near-uniform application of heat energy over a much larger area than the "object area" where the actual object is located, with no ability to control specifically which sub-regions of the layer are heated in the process. This may result, in certain cases, in thermal "bleed" around the outside of the object area.

The quality of the output object can be improved by controlling the application of heat energy to certain sub-regions of the build material layer. Certain examples described herein control the sub-regions of the build material layer where heat energy is applied by using arrays of laser modules. The examples described herein comprise arrays of laser modules where each laser module comprises stacks of laser diodes. Each laser module can be controlled individually. In particular, the amount of power sent to any one laser module in the array of laser modules can be modulated such that the amount of energy applied to a sub-region is individually controllable. This results in a higher build quality since heat energy is applied to those sub-regions surrounding the object area. Laser modules provide a convenient and efficient way of delivering targeted and concentrated heat energy to specific sub-regions of the build area of a three dimensional printing system. Certain examples of the methods and systems described herein are also applicable in the context of chemical binding and/or metal type additive manufacturing systems.

FIG. 1 is a simplified schematic diagram of a three dimensional printing system 100 according to an example. The three dimensional printing system 100 comprises a moveable carriage 110. The moveable carriage 110 is arranged to move relative to a layer of build material 120. The layer of build material is formed on a build platform 125. In the example shown in FIG. 1, the moveable carriage 110 is arranged to move in two directions in the x-axis indicated by the large arrows in FIG. 1. In other examples, the carriage 110 is stationary and the build material layer 120 is arranged to move relative to the carriage in the x-axis. In further examples, the moveable carriage and/or the layer of build material 120 are arranged to move in two axes such as the x and y axes.

The moveable carriage 110 comprises a print head 130. In the three-dimensional printing system 100 of FIG. 1, an object is built up layer by layer according to object data representing slices of the object. The three dimensional printing system 100 accesses the object data to print the object. Each layer of the object has a thickness in the z-axis. In one case, this thickness is between 70-120 microns, although the layer can be thinner or thicker in other examples. The three dimensional printing system 100 comprises at least one print head 130. In some cases, the three dimensional printing system 100 comprises two or more print heads 130 which dispense various printing agents. Portions of build material in each successive layer are solidified following application of fusing energy in accordance with the selective deposition of a printing agent from the print head 130 as the moveable carriage 110 moves over the layer of build material 120. The printing agent may be a fusing agent that comprises energy-absorbing chemical compounds, such that deposit of the fusing agent leads to the build material absorbing more energy upon application of fusing energy and heating up. For example, on areas of the layer of build material 120 where fusing agent is deposited, on application of energy, the fusing agent may cause the build material to fuse. A new layer of build material is then deposited on top of the fabricated layer.

In a general case, one or more printing agents may be applied to the layer to control the thermal profile of the layer and hence control fusion of build material. A detailing agent may also be applied, for example, to cool portion of build material. In certain cases, fusion may be influenced indirectly by the application of printing agents, e.g. a thermal profile may indicate that a particular region is to fuse but this may be controlled by application of fusing agent to neighboring regions. Detailing agents may be water-based and may be used to control fusion around the edges of objects, or by applied to areas of deposited fusing agent to lower a build material temperature (e.g. to ensure heating does not exceed a critical temperature).

The layer of build material 120 is formed on the build platform 125. In certain cases, a build unit containing a supply of build material is provided. In some examples, the build unit is an integral component in the three dimensional printing system 100. In other examples, a build unit is detachably coupled to the three dimensional printing system 100. In certain examples build material is provided via an internal material hopper. Once the new layer of build material 120 is deposited on the build platform 125 on the previously fabricated layer, the moveable carriage is controlled to move across the new layer of build material and fusing agent is deposited from the print head 120 at locations so that the next layer of the object can be formed.

According to examples described herein, the three dimensional printing system 100 comprises at least one array of laser modules 140. Two arrays of laser modules 140A, 140B are depicted in FIG. 1. In FIG. 1, the arrays of laser modules 140A, 140B are coupled to the moveable carriage 110. In this case, the arrays of laser modules 140 move simultaneously and in the same axes as the moveable carriage 110. In other examples, the three dimensional printing system 100 comprises a moveable carriage and at least one array of laser modules that is not connected to the moveable carriage. In certain examples, an array of laser modules is not coupled to the moveable carriage but is controllable to move relative to the layer of build material 120. In some cases this is implemented by connecting arrays of laser modules to a second carriage that is independently controllable, i.e. that may be moved and/or controlled separately from the first moveable carriage. In yet other examples, the three dimensional printing system 100 comprises a static array of laser modules.

Each array of laser modules 140A, 140B comprises one or more individual laser modules. According to examples, each individual laser module comprises a plurality of laser diodes.

In the example shown in FIG. 1, the arrays of laser modules 140 are aligned along a first axis that is substantially perpendicular to a direction of motion of the moveable carriage. The arrays of laser modules 140 are aligned in the y axis (not shown in FIG. 1), which is substantially perpendicular to the x and z axis shown in FIG. 1. The arrays of laser modules 140 are positioned on opposite sides of the moveable carriage 110. In other examples, the moveable carriage 110 comprises a different number of arrays of laser modules with the arrays of laser modules being aligned on one or both sides of the moveable carriage. In some examples the arrays of laser modules 140 extend the whole width of the working area where the layer of build material 120 is deposited. In other cases, the arrays of laser modules 140 extend partially across the width of the working area.

When connected to a power source, the arrays of laser modules 140 are controllable to project laser beams of variable intensities in a direction towards the layer of build material 120 in the z-axis. In certain cases, the arrays of laser modules 140 are connected to the same power source. The laser modules in the arrays 140 are individually controllable such that the intensity of the output of each individual module is varied. The laser diodes are, in certain cases, also individually controllable.

In certain examples the laser modules 140 comprise groups of laser diodes in regular arrays comprising 1-by-N groups or N-by-M groups of diodes. In certain examples, the groups are stacked on top of one another to increase the overall power output of the laser module. An example of such a configuration is described with reference to FIG. 4. Depending on the power output of the individual laser diodes, the size of the heating zone of a laser module across the build platform may vary. In certain examples, the arrays of laser modules 140A, 140B may provide an effective continuous zone of heating across the width of the build platform that is spanned by the array. In certain examples, the regions that are heated by adjacent laser modules overlap. In other cases, the power output of the laser modules is such that regions do not overlap.

According to examples described herein the three dimensional printing system 100 comprises a print controller 150. According to examples, the print controller 150 is a controller comprising circuitry to control power to the arrays of laser modules 140. The print controller 150 is communicatively coupled to the at least one array of laser modules 140. The print controller 150 is arranged to control activation of each laser module within at least one array of laser modules 140 during movement of the moveable carriage 110. As the moveable carriage 110 moves across the working area, energy is applied via the laser modules 140 to certain addressable sub-regions. This causes localized fusing of the build material in those areas of the addressable sub-regions where fusing agent is applied to the build material. In certain examples described herein, the print controller is arranged to control activation of the array of laser modules 140 such that energy is applied in the addressable sub-regions to cause localized fusing of the build material in the areas where fusing agent is applied to the build material and not to apply energy to those areas in sub-regions where no fusing agent has been applied. In certain cases energy is applied in addressable sub-regions where fusing agent is applied and is not applied to sub-regions where no fusing agent is applied. In other cases, energy is applied to addressable sub-regions which comprise areas where fusing agent has been applied as well as areas surrounding the areas where fusing agent has been applied.

In the example shown in FIG. 1, the moveable carriage 110 is arranged to move in both the "right" and "left" directions in the x axis. Similarly, the arrays of laser modules 140 are controllable when the moveable carriage 110 is moving in either direction. Hence, when the moveable carriage 110 is moving from left to right in the x-axis of FIG. 1, the print controller 150 can control the array of laser modules 140A on the left hand side to cause localized fusing of build material on areas of the build material layer 120 where the fusing agent has most recently been deposited. When the moveable carriage 110 is moving from the right to left in FIG. 1, the print controller 150 can control the array of laser modules 140B on the right hand side to heat regions of the build material layer 120 where fusing agent has recently been deposited. This provides an efficient method of operating the moveable carriage 110 to maximize the speed at which the layers of build material fuse.

In certain examples, a power supply to the arrays of laser modules is modulated to vary the amount of energy that is applied to the build material layer 120. According to certain examples described herein, the print controller 150 is arranged to generate a modulated power supply signal for each laser module in the arrays of laser modules 140. The print controller 150 is, in certain cases, arranged to modulate the power supply to each laser module in the arrays of laser modules 140 individually. Each laser module is arranged to apply energy to a specific sub-region of the build platform 125. In one case, if all laser modules are activated, a strip of build material will be exposed uniformly to laser energy. Certain examples of laser modules that may be used in the context of the printing system 100 provide a 'point' energy source. In other examples, laser modules with a wider area coverage than is provided by a single point source are used. An example of a laser module that may be used with the system 100 is a Monocrom® laser stack. The print controller 150 controls the amount of energy applied to sub-regions of the layer of build material by sending the modulated power signal to the array of laser modules 140. This allows, for example, more or less energy to be applied to certain sub-regions of the build material layer 120 to cause localized fusing.

In certain examples, the modulated power supply signals are generated based on data indicative of fusing agent deposit locations on the build material layer. For example, fusing agent deposit locations are represented by sets of x and y co-ordinates on a grid comprising addressable areas of the build material layer at a print resolution. This data is accessible to the print controller (or generated by the print controller if the print controller is communicatively coupled to the print head) and controls deposition of fusing agent on the build material layer 120. Based on this data, the print controller 140 modulates power supply signals to the arrays of laser modules 140 by determining an amount of power to cause localized fusing at those locations where fusing agent has been deposited.

Modulation of the power supply signal to individual laser modules may be used when more than one kind of build material is being used. In another case, modulation of the power supply signal may be applied when additional printing agents are used which result in fusing properties that are different to those present when fusing agent is deposited on the build material. For example, certain build materials have properties such that a larger amount of energy is to be imparted to the build material to cause the build material to fuse. In these cases, the ability to modulate individual laser modules in the arrays of laser modules 140 enables fine control over where heat energy is applied. In practice, this means much finer control over fusing is achievable with build materials of differing properties.

Figure 2:
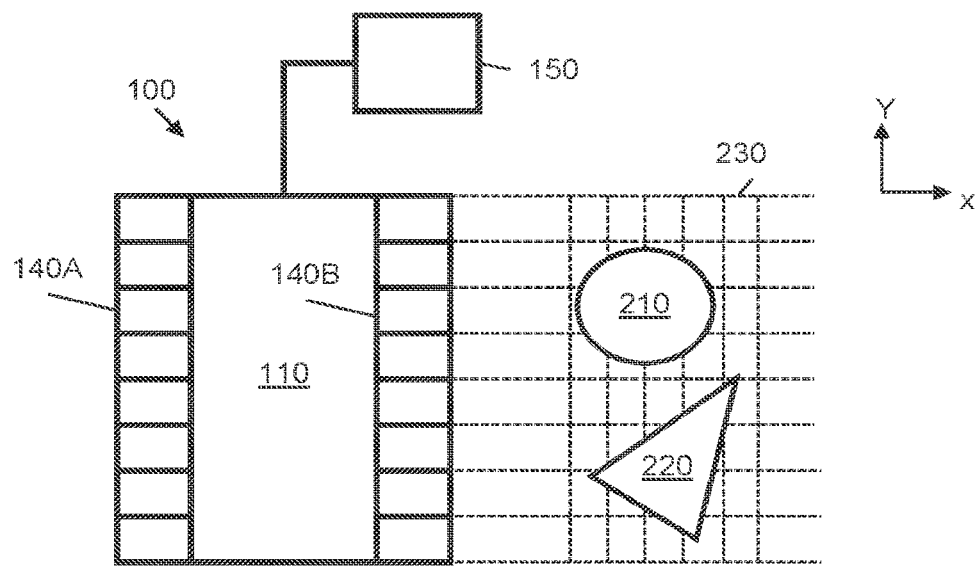
FIG. 2 is a schematic diagram of objects being built by a three dimensional printing system according to an example.

FIG. 2 is a schematic diagram showing a top view of the three dimensional printing system 100 according to an example. In the example shown in FIG. 2 the two arrays of laser modules 140A and 140B are visible. Each array of laser modules 140A, 140B spans the width of the working area where build material is deposited (i.e. the width of the working area in the y-axis). In other examples, the moveable carriage 110 may be arranged to move in both the x and y directions. In the example shown in FIG. 2, two objects 210, 220 are shown. The two objects 210 and 220 are constructed in a layer by layer fashion as described above. The moveable carriage 110 is arranged to move in the x axis across the working area. Build material is deposited across the working area to form each layer. The print head deposits fusing agent at locations where the objects 210 and 220 are being constructed. The print controller 150 is arranged to control the power to the arrays of laser modules 140A, 140B such that addressable sub regions of the build material layer are heated and the build material fuses to form the objects 210 and 220.

In the view of the printing system 200 shown in FIG. 2, the addressable sub-regions 230 are shown. The addressable sub-regions in FIG. 2 form a "chessboard"-like pattern across the build material layer 120. Each square in the chessboard-like pattern is addressable in the sense that the square is targetable with a laser module of the arrays of laser modules 140A, 140B. In certain examples, laser modules in the arrays 140A, 140B are arranged to provide energy to the whole area of build material within the addressable sub-regions uniformly. In other examples, the arrays of laser modules 140A, 140B comprise laser modules that are arranged to provide energy to a point where the amount of energy provided at any other point decreases away from the center point. The print controller 150 controls each individual laser module. Hence, any y-coordinate is addressable by switching on the individual laser module which lies within that particular y-coordinate. Similarly, the print controller 150 controls the time at which power is sent to each individual laser module. Hence, a particular x coordinate is targeted by having the print controller 150 send a power signal to switch on the various laser modules when the moveable carriage 110 moves in the x-axis to the particular x-coordinate.

In certain examples described herein, the array of laser modules 140A comprises at least as many laser modules as the array of laser modules 140B. In FIG. 2, the arrays of laser modules are aligned with each other in the y-axis. In other cases, the arrays of laser modules 140 are not aligned in the y-axis. In this second case, the addressable sub-regions associated with the second-array of laser 140B modules may overlap the addressable sub-regions associated with the first array of laser modules 140A. For example, if the array of laser modules 140A is offset by half of the width of a sub-region addressable by the array of laser modules 140B, then the sub-regions addressable by the array of laser modules 140B are shifted accordingly. This second case gives a greater degree of spatial modulation with respect to the y axis than the case where the arrays of laser modules 140 are aligned. It may also help avoid issues with a reduction of intensity at the boundaries between laser modules.

Figure 3:
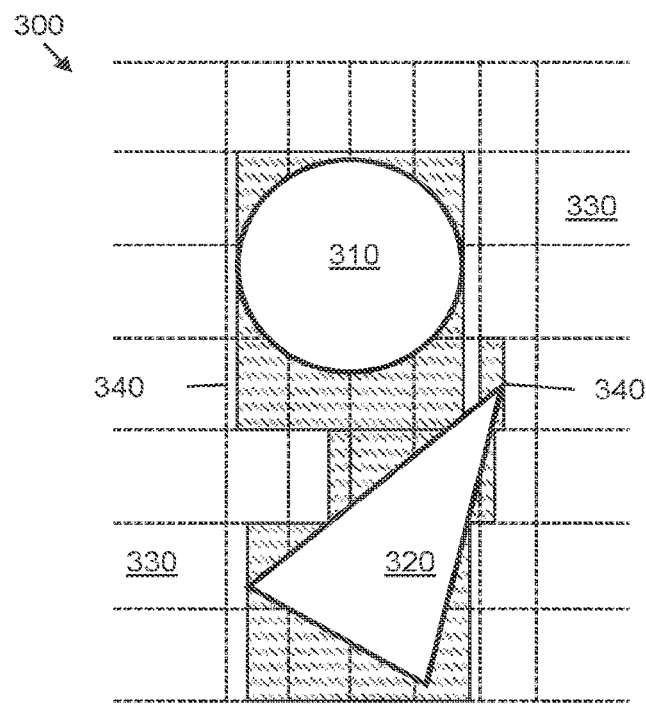
FIG. 3 is a schematic diagram of objects in a layer of build material according to an example.

FIG. 3 is a schematic diagram showing a close up view 300 of the objects 210 and 220 in FIG. 2. In FIG. 3, various addressable sub-regions of the build material layer are shown. The areas 310 and 320 correspond to the regions of build material where fusing agent has been applied in the process of fabricating the objects 210 and 220. Fusing agent may be applied at a print resolution, which may differ from the laser resolution that sets the addressable sub-regions. The non-shaded areas 330 in FIG. 3 represent areas of addressable sub-regions of the layer of build material 120 where no laser energy has been applied. The shaded areas 340 represent areas of the addressable sub-regions of the build material layer 120 where laser energy has been applied. In certain cases, for example, where the laser module array comprises a plurality of point lasers, shaded areas 340 may be of a variable size, by varying which lasers of the array are activated, such that the sub-regions are optimized in respect of their size for the regions where fusing agent is deposited. In one case, the size of the addressable sub-regions are dynamically varied, on-the-fly. In this case, the amount of power consumed by the printing system 100 may be reduced.

In certain examples described herein, there is a minimum addressable sub-region which is determined by the width of the laser modules in the y-direction and by the speed of the print carriage and responsiveness of the laser modules in the x-direction. In other examples the print carriage may be controlled to temporarily stop moving over a sub-region such that the minimal addressable sub-region is determined by the size of the laser module in the x and y-directions. In yet further examples there may be a maximal addressable sub-region where the laser modules are automatically deactivated by the print controller 150 after a certain amount of time has elapsed.

In FIG. 3, depending on the intensity used, laser energy may also be applied to the addressable sub-regions that are not visible below the solid areas 310 and 320. In contrast to previous methods, whereby heat energy was applied across the whole of the build material layer, FIG. 3 shows that a specific subset of addressable sub-regions of the build material layer are heated in the fabrication process. As shown in FIG. 3 this is an effective method of increasing the accuracy of the fusing phase of the fabrication process leading to higher quality manufactured output.

Figure 4:
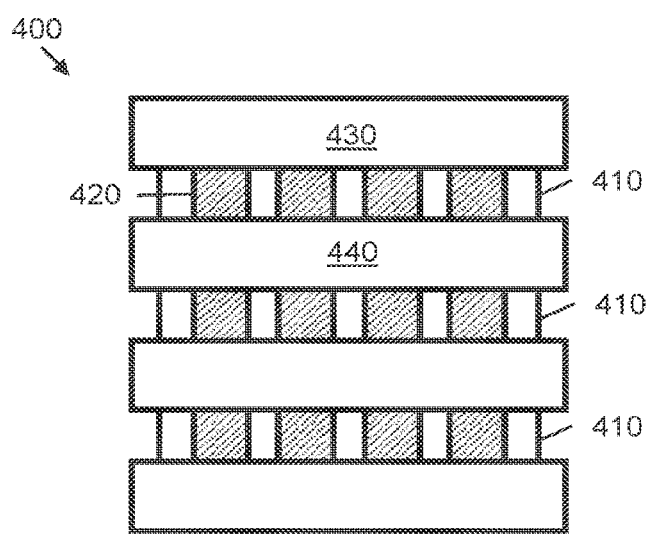
FIG. 4 is a schematic diagram of a laser module according to an example.

FIG. 4 is a schematic diagram of a laser module 400 according to an example. The laser module 400 is used in conjunction with the examples of the three dimensional printing system 100 described herein. The laser module 400 comprises a plurality of bars. In the example shown in FIG. 4 the laser module 400 comprises three bars 410. Each laser bar 410 is formed by a laser semiconductor strip with several laser diodes 420. Each laser diode 420 has a wavelength and power output. In certain examples, laser diodes may have a selected working frequency or wavelength. For example, the laser diodes may have a wavelength of 980 nm as an energy efficient configuration, or a wavelength of 1550 nm for eye safety. Other wavelengths are also possible depending on the specifications of each implementation. This semiconductor strip is sandwiched between two metal parts 430, 440 that function as electrodes and dissipation heatsinks. In some cases, the metal is a conducting metal such as copper.

There is an electrical contact between each of the metal parts and the anode and cathode of the laser diodes. The laser diodes 420 of each bar are electrically connected in parallel. The laser bars 410 are attached on top of one another such that they are electrically connected in series. In one example described herein, the arrays of laser modules 140 are implemented by attaching several laser modules 400 in a row. In other examples alternative configurations of laser modules are possible, for example, connecting laser modules in pairs. In certain examples described herein, a laser module comprises laser bars of different working frequencies. For example, in certain cases, a laser module comprises a mix of diodes at wavelengths of 930 nm and 980 nm.

Figure 5:
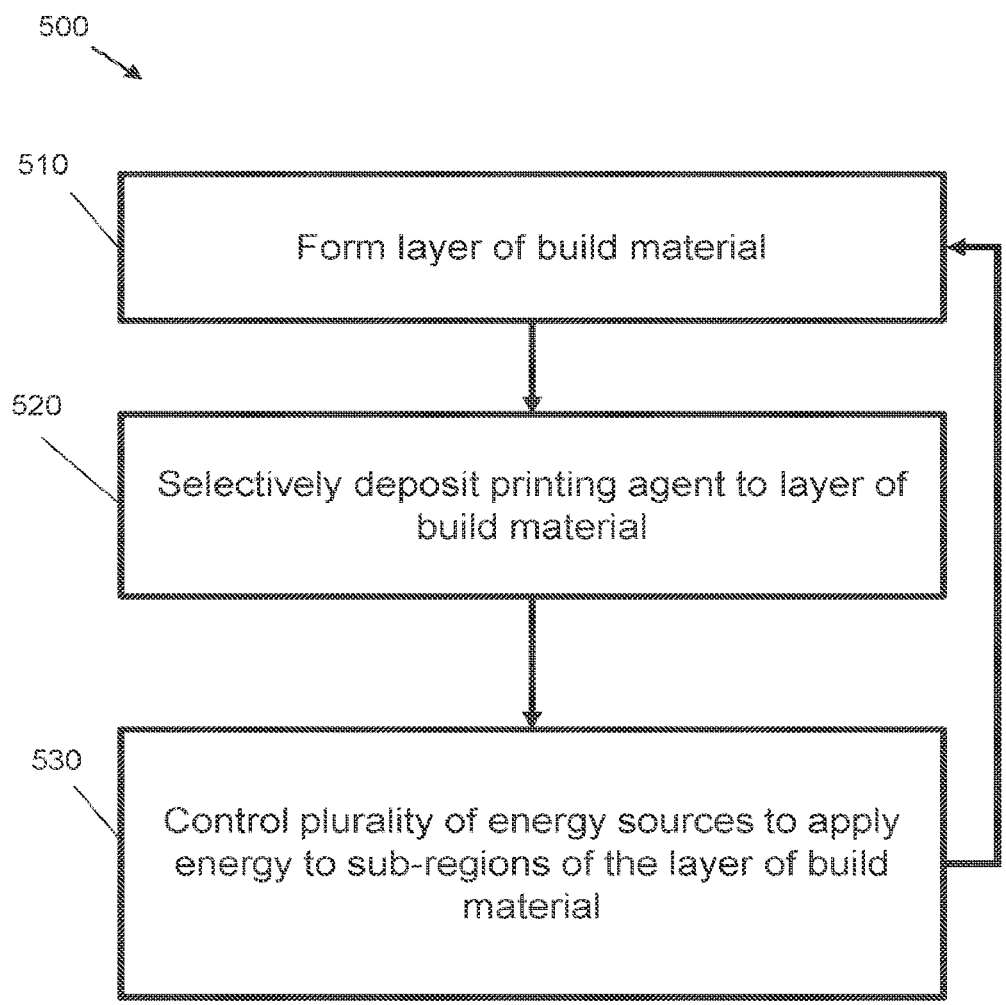
FIG. 5 is a flow chart showing a method of fabricating a three dimensional object according to an example.

FIG. 5 shows a method 500 of fabricating a three dimensional object according to an example. The method 500 is implemented on the three dimensional printing system 100 shown in FIG. 1. At block 510, a layer of build material is formed. In examples described herein, this may be formed using a build material supply system. It may be formed by distributing a thin layer of powdered build material over a platen, working area of a build unit or a previous layer of build material.

At block 520, fusing agent is selectively deposited on to the layer of build material. Block 520 is implemented at the printing head 130 shown in FIG. 1. The selective deposition of fusing agent is at locations on the layer of build material that may be determined from object data that represents the object that is to be fabricated.

At block 530, a plurality of laser modules are controlled to selectively apply energy to sub-regions of the layer of build material in accordance with the selective deposition of the fusing agent. According to certain examples, block 530 is implemented at the print controller 150 and arrays of laser modules 140A and 140B shown in FIG. 1. The application of energy to the sub-regions enables localized fusing of build material to fabricate a layer of the three dimensional object. As shown in FIG. 5, the method is repeated for multiple layers until an object is fabricated.

According to one example of the method 500, controlling the plurality of laser modules comprises determining which of the laser modules to activate based on the selective deposition of the fusing agent. In one case, data indicative of positions in the x and y axes where the fusing agent is deposited is mapped on to data to control activation of laser modules at specific locations.

In a further example of the method 500, the method 500 comprises controlling the power supplied to the plurality of laser modules to control the amount of energy applied to sub-regions of the layer of build material. In other words, the power supply to the plurality of laser modules is modulated.

In a further example of the method 500, the plurality of laser modules are coupled to a moveable carriage comprising a print head for selective deposit of the fusing agent and controlling the plurality of laser modules comprises controlling the power supplied to the plurality of laser modules during a pass of the moveable carriage above the layer of build material.

Figure 6:
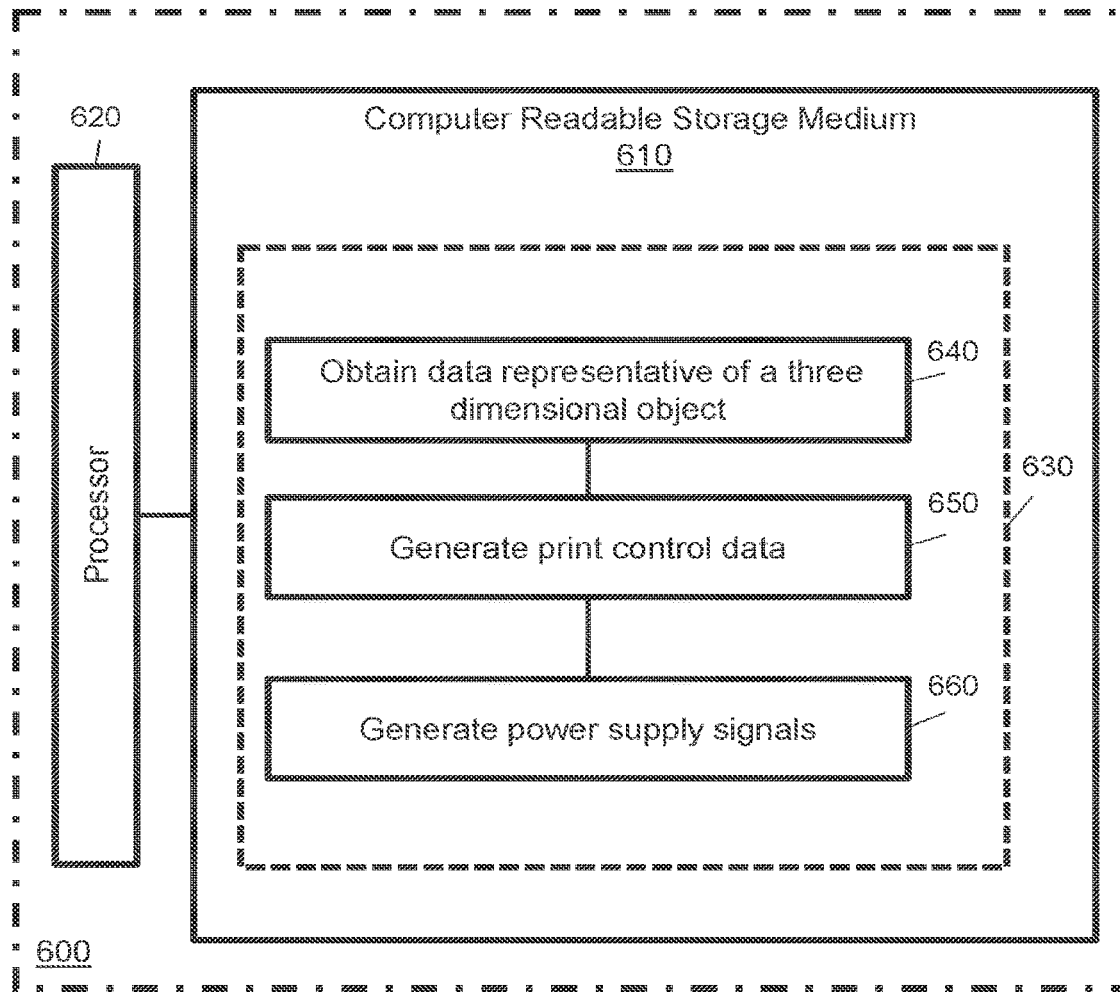
FIG. 6 is a schematic block diagram of a computer system according to an example.

Certain methods and systems as described herein may be implemented by one or more processors that process program code that is retrieved from a non-transitory storage medium. FIG. 6 shows an example 600 of a device comprising a computer-readable storage medium 610 coupled to at least one processor 620. The computer-readable media 610 can be any media that can contain, store, or maintain programs and data for use by or in connection with an instruction execution system. Computer-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc.

In FIG. 6, the computer-readable storage medium comprises program code 630 to: obtain data representative of a three dimensional object 640; generate, based on said the data representative of the three dimensional object, print control data to control a print head of a three dimensional printing system, the print control data controlling the to selectively deposit of fusing agent at a plurality of locations on a layer of build material, the fusing agent enabling localized fusing of the build material on application of energy 650; and generate, based on the print control data, power supply signals for each laser module in the print control data to an array of laser modules to apply energy to addressable sub-regions of the layer of build material 660.

In certain examples the computer-readable storage medium 600 comprises instructions to instruct movement of a moveable carriage comprising the print head across the layer of build material, wherein the power supply signals are synchronized with the movement of the moveable carriage to apply energy to the addressable sub-regions of the layer of build material.

Certain examples described herein enable energy to be selectively applied to addressable sub-regions of a layer of build material in a fabrication process of a three dimensional printing system. The selective application of energy is in both the x and y axes. This forms a "chess board"-like pattern across the layer of build material such that the application of heat energy is targeted in certain sub-regions where fusing agent is deposited.

The selective application of energy produces a higher part quality since the configuration of arrays of laser modules enable better selectivity of the sections of build material being fused.

Certain examples described herein also provide a greater degree of control over the power usage of the three dimensional printing system and improved power economy in the fabrication process. In particular, only the minimal number of laser modules in the array of laser modules are activated for each layer of build material in the fabrication process, as determined by the shape of the object. This also aids build material recyclability. Build material that is thermally fused in the fabrication process becomes part of the object. However, "caked" build material that is warmed during the pre-heating process but which doesn't fuse can be reused after a de-agglomeration process. It also makes unsolidified build material easier to remove after the heating process.

The examples described herein can also be used to generate objects out of materials with different characteristics. These materials can be used simultaneously in a single pass of the moveable carriage. Since the power to each individual laser module can be modulated, materials with differing thermal properties can be used in the fabrication of a single object.

The preceding description has been presented to illustrate and describe examples of the principles described. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

The invention claimed is:

1. A three dimensional printing system comprising:
 a moveable carriage comprising:
  a print head arranged to selectively deposit a printing agent on to a layer of build material as the moveable carriage is moved relative to the layer of build material, the printing agent configured to control localized fusing of the build material on application of energy;
 an array of laser modules comprising a plurality of laser bars, each laser bar being positioned between two metal parts that function as electrodes and dissipation heat-sinks for each laser bar; and
 a print controller communicatively coupled to the array of laser modules, wherein the print controller is configured to control activation of individual laser modules of the array of laser modules so as to apply, selectively, energy to addressable sub-regions of the layer of build material on which printing agent has been deposited to control fusing together with the deposited printing agent.

2. The three dimensional printing system of claim 1, wherein the array of laser modules are coupled to the moveable carriage and are aligned along an axis substantially perpendicular to a direction of motion of the moveable carriage, and wherein the print controller is to control activation of individual laser modules of the array of laser modules during movement of the moveable carriage.

3. The three dimensional printing system of claim 1, wherein the print controller is to generate a modulated power supply signal for each laser module in the array of laser modules to control an amount of energy applied to sub-regions of the layer of build material.

4. The three dimensional printing system of claim 3, wherein the modulated power supply signals are generated based on data indicative of printing agent deposit locations.

5. The three dimensional printing system of claim 1, wherein each laser module comprises a plurality of laser diodes.

6. The three dimensional printing system of claim 1, wherein the moveable carriage comprises a first and second array of laser modules and wherein the second array of laser modules is mounted on an opposite side of the moveable carriage to the first array of laser modules.

7. The three dimensional printing system of claim 6, wherein the second array of laser modules is aligned such that the addressable sub-regions of the build material associated with the second array of laser modules overlap the addressable sub-regions associated with the first array of laser modules.

8. The three dimensional printing system of claim 1, wherein the build material comprises a powdered polyamide.

9. The three dimensional printing system of claim 1, wherein the print controller is to control activation of individual laser modules of the array of laser modules to dynamically vary the size of the sub-regions on which energy is applied.

10. The three dimensional printing system of claim 1, wherein the print controller is to modulate a power supply signal to individual laser modules in response to more than one kind of build material being used.

11. The three dimensional printing system of claim 1, wherein the print controller is to modulate a power supply signal to individual laser modules in response to multiple printing agents being used.

12. The three dimensional printing system of claim 1, wherein, for each laser bar, the plurality of laser diodes are electrically connected in parallel.

13. The three dimensional printing system of claim 1, wherein the laser bars are electrically connected in series.

14. The three dimensional printing system of claim 1, wherein the laser module comprises laser bars of different working frequencies.

15. A method of fabricating a three dimensional object with a three dimensional printing system, the method comprising:
- forming a layer of build material;
- with a moveable carriage comprising a print head, selectively depositing a printing agent on to the layer of build material as the moveable carriage is moved relative to the layer of build material, the printing agent controlling localized fusing of the build material on application of energy; and
- with a print controller communicatively coupled to an array of laser modules, individually controlling the array of laser modules to selectively apply energy to addressable sub-regions of the layer of build material in accordance with the selective deposition of the printing agent to control fusing together with the deposited printing agent, wherein the array of laser modules comprises a plurality of laser bars, each laser bar being positioned between two metal parts that function as electrodes and dissipation heatsinks for each laser bar;
- wherein the application of energy to the sub-regions enables localized fusing of build material where printing agent is deposited to fabricate a layer of the three dimensional object.

16. The method of claim 15, wherein controlling the plurality of laser modules, comprises determining which of the laser modules to activate based on the selective deposition of the printing agent.

17. The method of claim 15, comprising controlling the power supplied to the plurality of laser modules to control the amount of energy applied to sub-regions of the layer of build material.

18. The method of claim 15, wherein the plurality of laser modules are coupled to a moveable carriage comprising a print head for selective deposit of the printing agent and controlling the plurality of laser modules comprises controlling the power supplied to the plurality of laser modules during a pass of the moveable carriage above the layer of build material.

19. A non-transitory machine readable medium comprising instructions which, when loaded into memory and executed by at least one processor, cause the processor to:
- obtain data representative of a three dimensional object;
- generate, based on the data representative of the three dimensional object, print control data to control a moveable carriage comprising a print head of a three dimensional printing system, the print control data controlling the selective deposit of a printing agent at a plurality of locations on a layer of build material as the moveable carriage is moved relative to the layer of build material, the printing agent controlling localized fusing of the build material on application of energy; and
- generate, based on the print control data, power supply signals for each laser module in an array of laser modules to apply, selectively, energy to addressable sub-regions of the layer of build material on which print agent has been deposited to control fusing together with the deposited printing agent, wherein the array of laser modules comprises a plurality of laser bars, each laser bar being positioned between two metal parts that function as electrodes and dissipation heatsinks for each laser bar.

20. The non-transitory machine readable medium of claim 19, wherein the instructions cause the processor to:
- instruct movement of a moveable carriage comprising the print head across the layer of build material,
- wherein the power supply signals are synchronized with the movement of the moveable carriage to apply energy to the addressable sub-regions of the layer of build material.

* * * * *